United States Patent
Ashbrook et al.

(10) Patent No.: US 9,767,757 B2
(45) Date of Patent: Sep. 19, 2017

(54) PIPELINED PIXEL APPLICATIONS IN LIQUID CRYSTAL ON SILICON CHIP

(71) Applicant: FINISAR CORPORATION, Sunnyvale, CA (US)

(72) Inventors: Jonathan B. Ashbrook, Homer, IL (US); Nicholas F. Jungels, Champaign, IL (US)

(73) Assignee: FINISAR CORPORATION, Sunnyvale, CA (US)

(*) Notice: Subject to any disclaimer, the term of this patent is extended or adjusted under 35 U.S.C. 154(b) by 590 days.

(21) Appl. No.: 13/749,536

(22) Filed: Jan. 24, 2013

(65) Prior Publication Data
US 2014/0204330 A1   Jul. 24, 2014

(51) Int. Cl.
*G09G 3/36*      (2006.01)
*H04Q 11/00*   (2006.01)
*G02F 1/1362*  (2006.01)

(52) U.S. Cl.
CPC ....... *G09G 3/3688* (2013.01); *H04Q 11/0005* (2013.01); *G02F 2001/136281* (2013.01); *G02F 2203/585* (2013.01); *G09G 2310/0251* (2013.01); *G09G 2310/0259* (2013.01); *G09G 2310/0294* (2013.01); *H04Q 2011/0035* (2013.01); *H04Q 2011/0039* (2013.01)

(58) Field of Classification Search
CPC ............ G09G 3/36; G09G 2300/0434; G09G 2300/0439; G09G 2300/0443; G09G 2300/0447; G09G 2300/0452; G09G 2300/0456; G09G 2300/046; G09G 2300/0465; G09G 2300/0469; G09G 2300/0473; G09G 2300/0478; G09G 2300/0482; G09G 2300/048; G09G 3/3688; H04Q 11/00; G02F 2203/136281
USPC .................................................. 345/87, 204
See application file for complete search history.

(56) References Cited

U.S. PATENT DOCUMENTS

| | | | |
|---|---|---|---|
| 6,160,535 A * | 12/2000 | Park | G09G 3/3607 345/100 |
| 2004/0233150 A1* | 11/2004 | Guttag et al. | 345/87 |
| 2005/0088462 A1 | 4/2005 | Borel | |
| 2010/0045638 A1* | 2/2010 | Cho | G09G 3/3688 345/204 |

(Continued)

FOREIGN PATENT DOCUMENTS

| JP | H10-253987 A | 9/1998 |
|---|---|---|
| JP | H11-44873 A | 2/1999 |

(Continued)

OTHER PUBLICATIONS

International Search Report and Written Opinion mailed Jun. 25, 2014 as received in PCT Application No. PCT/US2014/013052.

*Primary Examiner* — Grant Sitta
(74) *Attorney, Agent, or Firm* — Maschoff Brennan (57) ABSTRACT

An example embodiment includes a LCOS IC. The LCOS IC includes multiple pixels, a column driver, and multiple conductive lines. The pixels are arranged in a pixel array. The column driver is configured to supply multiple signals to a column of pixels included in the pixel array. Each of the conductive lines couples the column driver to a subset of pixels in the column of pixels. The conductive lines are configured such that two or more of the signals can be supplied to two or more of the subsets of pixels with some overlapping duration.

16 Claims, 6 Drawing Sheets

(56) References Cited

U.S. PATENT DOCUMENTS

| | | | |
|---|---|---|---|
| 2010/0182297 A1* | 7/2010 | Lan | G09G 3/3614 345/211 |
| 2011/0025900 A1* | 2/2011 | Kondo | 348/308 |
| 2011/0242088 A1* | 10/2011 | Kim | G09G 3/3611 345/214 |
| 2012/0081340 A1* | 4/2012 | Lee | G09G 3/3685 345/206 |
| 2012/0105494 A1* | 5/2012 | Lee | G09G 3/3614 345/690 |
| 2012/0287179 A1* | 11/2012 | Rossini | A43D 3/1425 345/690 |

FOREIGN PATENT DOCUMENTS

| | | |
|---|---|---|
| JP | 2002-40996 A | 2/2002 |
| JP | 2004-180011 A | 6/2004 |
| JP | 2005-091763 A | 4/2005 |

* cited by examiner

PIPELINED PIXEL APPLICATIONS IN LIQUID CRYSTAL ON SILICON CHIP

BACKGROUND

Field of the Invention

Embodiments described herein relate generally to optical switches. More particularly, example embodiments relate to liquid crystal on silicon integrated circuits (LCOS ICs) that may be included in optical switches.

Related Technology

Signal-carrying light may be multiplexed onto an optical fiber to increase the capacity of the optical fiber and/or enable bidirectional transmission. Optical switches are generally used to multiplex, de-multiplex, or dynamically route a particular channel of the signal-carrying light. One type of optical switch is a wavelength selector switch (WSS) which routes the particular channel based on the wavelength of the particular channel.

In some WSS, liquid crystal on silicon (LCOS) technology is used to create a display engine that deflects a wavelength of the particular channel. In LCOS technology, liquid crystals may be applied to a surface of a silicon chip. The silicon chip may be coated with a reflective layer. For example, the reflective layer may include an aluminized layer. Additionally, in LCOS technology, the display engine may include multiple pixels. Through introduction and alteration of electrical voltage applied to the pixels, the pixels create an electrically controlled grating that routes the particular channel in a deflected direction.

In some WSS, differences in the electrical voltage between pixels may damage the pixels. To avoid the differences, the pixels may be pre-charged a specific voltage between introductions of target electrical voltages.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Embodiments described herein relate generally to optical switches. More particularly, example embodiments relate to liquid crystal on silicon integrated circuits (LCOS ICs) that may be included in optical switches.

An example embodiment includes a LCOS IC. The LCOS IC includes multiple pixels, a column driver, and multiple conductive lines. The pixels are arranged in a pixel array. The column driver is configured to supply multiple signals to a column of pixels included in the pixel array. Each of the conductive lines couples the column driver to a subset of pixels in the column of pixels. The conductive lines are configured such that two or more of the signals can be supplied to two or more of the subsets of pixels with some overlapping duration.

Another example embodiment may include a method of pipelined pixel signal communication in a liquid crystal on silicon integrated circuit. The method includes enabling a first row of pixels including a first pixel positioned in a first column. The method also includes enabling a second row of pixels including a second pixel positioned in the first column. The method also includes supplying a first signal to the first pixel. During at least some portion of the time period when the first signal is supplied, the method also includes supplying a second signal to the second pixel.

Another example embodiment may include a liquid crystal on silicon (LCOS) system. The LCOS system includes an LCOS IC, a driver chip, and multiple column drivers. The LCOS IC includes multiple pixels arranged in columns and rows. Each column includes a first conductive line coupled to the pixels positioned in the even-numbered rows and a second conductive line coupled to the pixels positioned in the odd-numbered rows. The driver chip is configured to supply a variable voltage signal to the LCOS IC. Each column driver is configured to produce a driven signal from the variable voltage signal, supply the driven signal to the first conductive line or the second conductive line, and at least partially during the supply of the driven signal, supply a flash signal to the other of the first conductive line or the second conductive line.

This Summary is provided to introduce a selection of concepts in a simplified form that is further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Embodiments described herein relate generally to optical switches. More particularly, example embodiments relate to liquid crystal on silicon integrated circuits (LCOS ICs) that may be included in optical switches. One example embodiment includes a LCOS IC that includes a column driver and pixels arranged in a pixel array. The pixel driver includes a first conductive line, a second conductive line, a primary circuit, a flash circuit, and a line switch. The first conductive line is coupled to a first subset of pixels of the pixel array. The second conductive line is coupled to a second subset of pixels of the pixel array. The primary circuit outputs a driven signal. The flash circuit outputs a flash signal. The line switch is configured to couple the primary circuit to one of the first conductive line or the second conductive line, and couple the flash circuit to the other of the first conductive line or the second conductive line such that the driven signal and the flash signal are at least partially supplied simultaneously. Additionally, example embodiments of the present invention will be explained with reference to the accompanying drawings.

Figure 1:
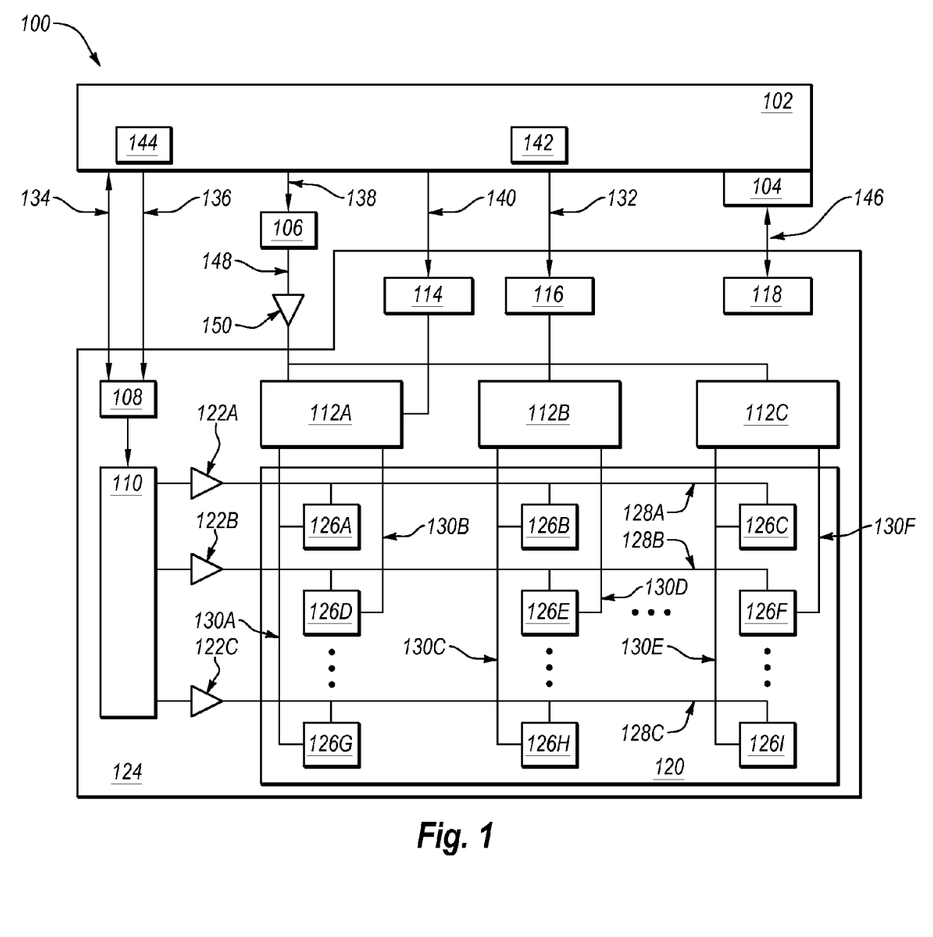
FIG. 1 is a block diagram of an example liquid crystal on silicon (LCOS) system 100 in which the embodiments disclosed herein may be implemented.

FIG. 1 is a block diagram of an example liquid crystal on silicon (LCOS) system 100 in which the embodiments disclosed herein may be implemented. Generally, the LCOS system 100 writes images used to select wavelength or channels of optical signal-carrying light (optical signals). The LCOS system 100 can include a driver chip such as a field programmable gate array (FPGA) 102 that controls the liquid crystal on silicon integrated circuit (LCOS IC) 124. To control the LCOS IC 124, the FPGA 102 communicates commands, synchronization signals, digital data, varying analog and/or digital signals, or some combination thereof. Additionally, the FPGA 102 may receive various analog and/or digital data signals, output synchronization signals, etc. from the LCOS IC 124.

The FPGA 102 is an integrated circuit (IC) with logic blocks, which may be configured to perform one or more control functions of the LCOS IC 124. The FPGA 102 may be configured and/or programmed after the LCOS system 100 is delivered to a user or following manufacturing of the FPGA 102. In some alternative embodiments the driver chip may include an application specific integrated circuit (ASIC) or another suitable driver chip having substantially equivalent capabilities of the FPGA 102.

The FPGA 102 may include a digital port 142 which may communicate with a demultiplexing module 116 included in the LCOS IC 124. An example of the digital port 142 may include a low voltage differential signal (LVDS) pair. The FPGA 102 may communicate digital data through the digital port 142 to the demultiplexing module 116. In FIG. 1, arrow 132 represents the communication of digital data to the demultiplexing module 116. Digital data may include, but is not limited to, a digital clock signal that may be used as a synchronization signal and digital image data for one or more pixels 126A-126I (generally, pixel 126 or pixels 126) included in the LCOS IC 124. The digital image data includes a digital representation of an image the LCOS IC 124 displays. The digital image data may be formatted as 6 bit per pixel, 7 bit per pixel, or 8 bit per pixel, for example. The digital data, or some portion thereof, may be communicated to one or more column drivers 112A-112C (generally, column driver 112 or column drivers 112) which may then be communicated to the pixels 126. Some additional details of the column drivers 112 and the pixels 126 are provided below.

Some embodiments of the FPGA 102 may include multiple digital ports 142 and/or the LCOS IC 124 may include multiple demultiplexing modules 116. In embodiments in which the FPGA 102 includes multiple digital ports 142, the FPGA 102 may communicate a specific or a set amount of digital data through each of the digital ports 142 in parallel. For example, in some embodiments, the FPGA 102 includes thirty-two digital ports 142. Each of the thirty-two digital ports 142 may communicate digital image data for a bank of pixels 126 including sixty columns of pixels 126.

The FPGA 102 may also include a command port 144 that communicates commands to a command decoder 108. In FIG. 1, arrow 136 represents the communication of commands to the command decoder 108. The commands may include one or more actions and/or functions for the LCOS IC 124 to perform. For example, a command may include timing of operations to write a row of the pixels 126. A timing command may be controlled by the FPGA 102 via the command port 144. Additionally or alternatively, a command may include a digital clock signal that may be used as a synchronization signal. In some embodiments, the FPGA 102 may include multiple command ports 144.

The command decoder 108 and the command port 144 may also communicate additional signals. In FIG. 1, double-ended arrow 134 represents the communication of additional signals between the command port 144 and the command decoder 108. For example, the additional signals may include, but are not limited to, an auxiliary digital data signal, a reset signal, data out signals from the LCOS IC 124, and output clock signals from the LCOS IC 124. The reset signal and the auxiliary digital data signal may include a digital clock signal as a synchronization signal. The data out signals and the output clock signals may communicate information regarding synchronization and operational status of the LCOS IC 124 to the FPGA 102.

The FPGA 102 may also include an analog module 104 that communicates analog signals with an LCOS analog module 118. In FIG. 1, the double-ended arrow 146 represents the communication between the analog module 104 and the LCOS analog module 118.

The FPGA 102 may also communicate a digital ramp signal to a digital to analog converter (DAC) 106. In FIG. 1, arrow 138 represents the communication of the digital ramp signal to the DAC 106. The DAC 106 receives the digital ramp signal and outputs an analog ramp signal related to the digital ramp signal. The digital ramp signal is a binary number that represents and is proportional to an analog voltage of the analog ramp signal output from the DAC 106.

In one embodiment, the digital ramp signal includes a series of binary numbers that are converted to a monotonically varying voltage which ramps from an initial voltage to a final voltage. The term "ramp" refers to the behavior of incrementally varying at a defined rate. That is, in some embodiments, an initial binary number of the digital ramp signal is converted to an initial voltage which may be as high as about 12 volts (V). The digital ramp signal may subsequently include binary numbers resulting in an analog ramp signal that monotonically steps down to a final voltage. Alternatively, an initial binary number of the digital ramp signal can be converted to an initial voltage which may be as low as 0 V. The digital ramp signal may subsequently include binary numbers that result in voltages that monotonically step up to a final voltage. In some embodiments, each step may be a predetermined time interval during which the digital ramp signal includes a binary number that results in a predetermined change in voltage. Additionally, the digital ramp signal may vary according to a gamma curve, which can correct for nonlinear optical response of LCOS material.

The digital ramp signal is not limited to the series of binary numbers that result in the monotonically ramping voltage. The digital ramp signal can include a series of binary numbers that result in multiple patterns or progressions of voltages. For example, the digital ramp signal can include binary numbers that result in a set of increasing voltages and then a set of decreasing voltages, vice versa, or some other suitable pattern resulting in voltages covering the range of voltages to drive the pixels 126 of the LCOS IC 124A.

As stated above, the DAC 106 converts the digital ramp signal to an analog ramp signal representative of the binary number included in the digital ramp signal. Accordingly, the analog ramp signal is an analog representation of the digital ramp signal. The analog ramp signal may exhibit incrementally varying behavior equivalent or related to the digital ramp signal. Thus, in some embodiments, the analog ramp signal monotonously varies from the initial voltage to the final voltage, supplying a varying voltage signal to the pixels 126. More specifically, the analog ramp signal supplies target voltages to the pixels 126. The target voltages are defined voltages within the inclusive range of the initial voltage to the final voltage of the analog ramp signal. The LCOS IC 124A operates, at least partially, through driving the target voltages to the pixels 126.

A brightness of a pixel 126 may be determined by the magnitude of a target voltage supplied to the pixel 126. Thus, the brightness of the pixel 126 is controlled by driving the analog ramp signal during the time in which the target voltage of the analog ramp signal is equal to the voltage corresponding to a desired brightness. Pixels 126 may include multiple levels of brightness. For example, in some embodiments the pixel 126 can be programmed to display 256 or more levels of brightness. The process of supplying the pixels 126 with target voltages may be referred to as "writing an image."

Additionally, the analog ramp signal may monotonically vary from the initial voltage to the final voltage once per writing cycle of the pixels 126. The initial voltage and the final voltage may periodically change, interchange, or turn around. That is, in a first writing cycle, the final voltage may be greater than the initial voltage. In a second writing cycle, the initial voltage may be greater than the final voltage. In a third cycle, the final voltage may again be greater than the initial voltage. The initial voltage and the final voltage may continue to change in this pattern.

To determine when to supply the analog ramp signal to the pixels 126, the FPGA 102 may also communicate a ramp counter enable signal to a ramp counter 114 included in the LCOS IC 124. In FIG. 1, arrow 140 represents the communication of the ramp counter enable signal to the ramp counter 114. Generally, the ramp counter 114 receives the ramp counter enable signal from the FPGA 102, which enables or turns on the ramp counter 114. Once enabled, the ramp counter 114 counts or tracks the number of predetermined time intervals of the digital ramp signal that have occurred since receiving the ramp counter enable signal. The number of predetermined time intervals of the digital ramp signal may be equivalent and/or related to the number of predetermined time intervals of the analog ramp signal. More specifically, in some embodiments, the digital ramp signal may include a ramp clock signal. The ramp clock signal may act as a synchronization signal. The ramp counter 114 may track and/or count the number of predetermined time intervals included in the ramp clock signal following the reception of the ramp counter enable signal. The ramp counter 114 may output or otherwise make available a ramp step signal indicating the number of predetermined time intervals.

The ramp counter 114 may be coupled to the column drivers 112. The ramp counter 114 may communicate the ramp step signal to the column drivers 112. Thus, the ramp counter 114 and the ramp step signal may be used to determine the voltage of the analog ramp signal at a specific time. That is, the voltage of the analog ramp signal may be calculated if the initial voltage resulting from an initial binary number of the digital ramp signal, the predetermined voltage change per predetermined time interval, and the ramp step signal are known.

Referring back to the DAC 106, the analog ramp signal exiting the DAC 106, which is indicated by the line 148, enters an external buffer 150. The external buffer 150 may buffer the DAC 106 and/or the FPGA 102 from the LCOS IC 124. From the external buffer 150, the analog ramp signal enters the LCOS IC 124 and supplies the column drivers 112, which then supplies the pixels 126 or some subset thereof included in an array core 120.

Each of the pixels 126 may include a NMOS/PMOS complementary switch, a metal insulator-metal (MIM) capacitor, and a piece of top-layer metal. The complementary switch may enable linear transfer of voltage supplied by the column drivers 112 to enter the pixel 126. The MIM capacitor may be included to provide enough capacitive storage to limit charge leakage during a field time. In the depicted embodiment, the array core 120 includes nine pixels 126. However, this depiction is not limiting. The ellipses are included to illustrate that the array core 120 may include more than nine pixels 126. In some embodiments, the array core 120 may be separated into banks of columns which banks of columns may be coupled to one of the digital port 142 (described above).

In this and other embodiments, the array core 120 includes the pixels 126 that may be organized into columns and rows. The pixels 126 in each row may be electrically coupled to a row decode 110 via a row wire 128A-128C (generally, row wire 128 or row wires 128). The row decode 110 may receive commands from the command decoder 108. Specifically, the row decode 110 may receive commands related to activation of the pixels 126 in a row. The row decode 110 may then communicate the command related to activation through a row enable amplifier 122A-122C (generally, row enable amplifier 122 or row enable amplifiers 122), along one of the row wires 128 to the pixels 126 in the row. The activation signal enables or triggers the receiving pixels (i.e., the pixels 126 in the row coupled to the row enable amplifier 122) to become activated such that the pixels 126 may receive one or more signals supplied by one of the column drivers 112.

In some embodiments, the pixels 126 may be activated row by row. That is, the first row enable amplifier 122A communicates the activation signal to the first pixel 126A, the second pixel 126B, and the third pixel 126C through the first row wire 128A. After the first pixel 126A, the second pixel 126B, and the third pixel 126C are written, the second row enable amplifier 122B then communicates the activation signal to the fourth pixel 126D, the fifth pixel 126E, and the sixth pixel 126F through the second row wire 128B.

The pixels 126 in each column may be electrically coupled to one of the column drivers 112 via one or more conductive lines 130A-130F (generally, conductive line 130 or conductive lines 130). Each of the column drivers 112 supplies one or more signals to the pixels 126 in a column via the conductive lines 130. Generally, including the multiple conductive lines 130 enables the column drivers 112 to supply different signals to one or more subsets of pixels 126 in the column. For example, in this and other embodiments, the column driver 112 is coupled to the pixels 126 in the column via two conductive lines 130. Accordingly, a first signal may be supplied to a first subset of the pixels 126 in the column and a second signal to a second subset of pixels 126 in the column. The first signal and the second signal may be supplied simultaneously or the first signal may be supplied at least partially during the supply of the second signal. That is, during the supply of the first signal to the first subset of pixels 126, the second signal may be supplied to the second subset of pixels 126.

Each of the conductive lines 130 may be coupled to a subset of the pixels 126 based on the position of the pixel 126 in the array core 120. For example, a first column driver 112A may include a first conductive line 130A coupled to a first subset of pixels 126 including the first pixel 126A in the first row and a seventh pixel 126G in the third row. Additionally the first column driver 112A may include a second conductive line 130B coupled to a second subset of pixels 126 including the fourth pixel 126D in the second row. Thus, the first subset of pixels 126 includes the pixels 126 in odd-numbered rows (i.e., the first row and the third row) of the first column and the second subset of pixels 126 includes the pixels 126 in the even-numbered rows (i.e., the second row) of the first column. Likewise, a second column driver 112B may include a third conductive line 130C coupled to a third subset of pixels 126 including the second pixel 126B in the first row and an eighth pixel 126H in the third row. The second column driver 112B may include a fourth conductive line 130D coupled to a fourth subset of pixels 126 including the fifth pixel 126E in the second row. Thus, the third subset of pixels 126 includes the pixels 126 in the odd-numbered rows (i.e., the first row and the third row) of the second column and the fourth subset of pixels 126 are the pixels 126 in the even-numbered rows (i.e., the second row) of the second column.

In FIG. 1, each column of pixels includes two conductive lines 130 which are each coupled to pixels 126 in even-numbered rows or odd-numbered rows (as described above). However, this depiction is not meant to be limiting. In some embodiments, each column of pixels may include four or more pixels 126 that may be coupled to the column driver 112 via two or more conductive lines 130. For instance, a column of pixels may include twelve pixels 126 and four conductive lines 130 that couple every third pixel 126 to a column driver 112. In this example embodiment, the column driver 112 may supply four signals to the subsets of pixels 126.

Figure 2:
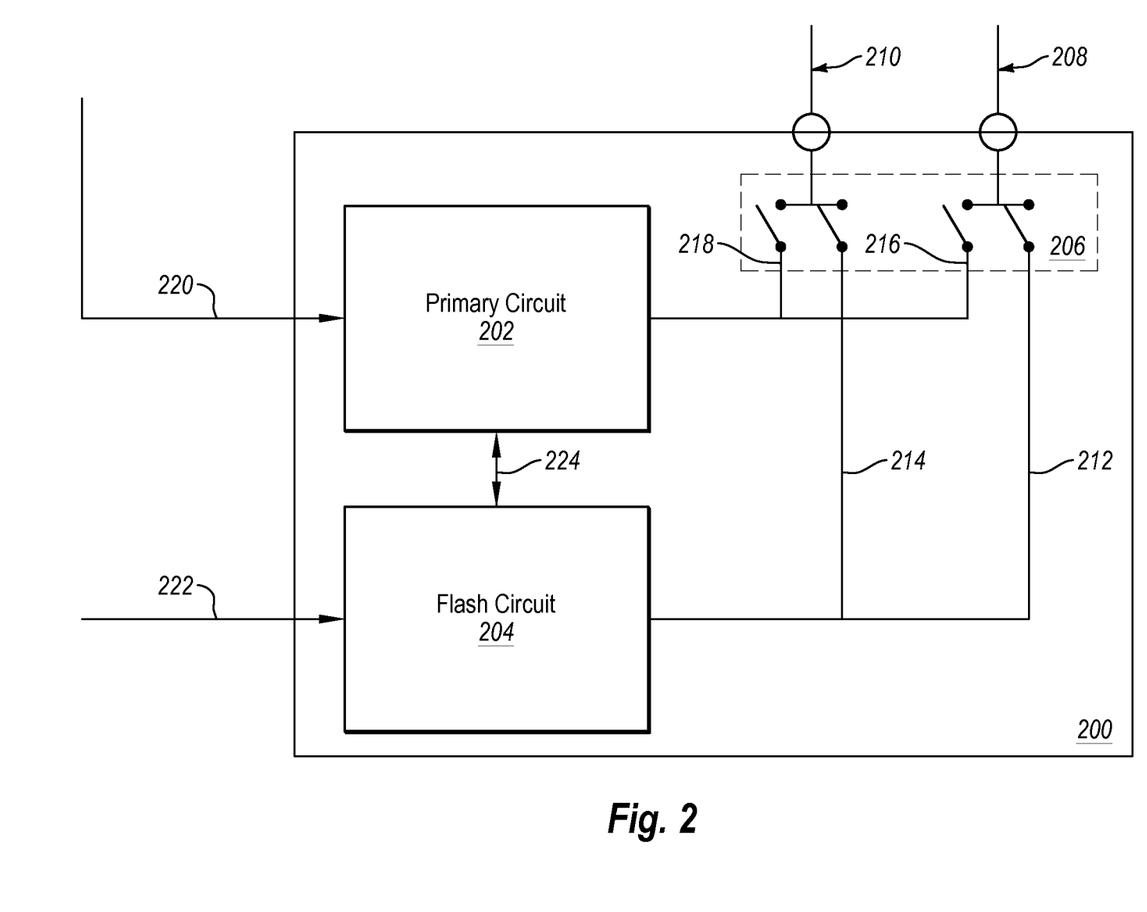
FIG. 2 is a block diagram of an example column driver that may be implemented in the LCOS system of FIG. 1.

FIG. 2 is a block diagram of an example column driver 200 that may be implemented in the LCOS system 100 of FIG. 1. The column driver 200 may include a primary circuit 202, a flash circuit 204, and a line switch 206. Generally, the primary circuit 202 outputs a first signal, the flash circuit 204 outputs a second signal, and line switch 206 couples the primary circuit 202 to one of a first conductive line 210 or a second conductive line 208 and couples the flash circuit 204 to the other of the first conductive line 210 or the second conductive line 208. The line switch 206 may enable the first signal from the primary circuit 202 and the second signal from the flash circuit 204 to be supplied with some overlapping duration.

The primary circuit 202 and/or the flash circuit 204 may each receive an input signal 220 and 222, respectively. The input signals 220/222 may include, but are not limited to, an analog ramp signal, digital data, a ramp counter signal, a flash trigger, and a target count signal (discussed above). In some circumstances and under some conditions, the input signal 220 to the primary circuit 202 and the input signal 222 to the flash circuit 204 may include one or more common signals. Additionally, in some embodiments, the input signal 220 to the primary circuit 202 or the input signal 222 to the flash circuit 204 may be communicated between the primary circuit 202 and the flash circuit 204, which is represented in FIG. 2 by line 224. For example, the input signal 220 of the primary circuit 202 may include the analog ramp signal and may be communicated to the flash circuit 204.

The primary circuit 202 outputs the first signal to the output lines 218 and 216. The first signal may include a driven signal that includes a voltage that writes an image to the pixels (not shown in FIG. 2) coupled to the first conductive line 210 or the second conductive line 208. Likewise, the flash circuit 204 outputs the second signal to the flash output lines 214 and 212. The second signal may include a flash signal that flashes the pixels coupled to the first conductive line 210 or the second conductive line 208. As used herein, the term "flashing" includes charging the pixels to an intermediate voltage.

A first output line 218 and a first flash output line 214 may be configured such that the line switch 206 selectively couples the first output line 218 or the first flash output line 214 to the first conductive line 210. A second output line 216 and a second flash output line 212 may be configured such that the line switch 206 selectively couples the second output line 216 or the second flash output line 212 to the second conductive line 208.

In operation, the line switch 206 couples the first signal from the primary circuit 202 to one of the first or second conductive lines 210 or 208 and simultaneously couples the second signal from the flash circuit 204 to the other of the first or the second conductive lines 210 or 208.

For example, the primary circuit 202 may output the driven signal to the output lines 218 and 216. At about the same time the flash circuit 204 may output the flash signal to the flash output lines 214 and 212. The line switch 206 couples the first output line 218 to the first conductive line 210 and couples the second flash output line 212 to the second conductive line 208. In this configuration, the column driver 200 is supplying the driven signal (i.e., the first signal) to the pixels coupled to the first conductive line 210 and the flash signal (i.e., the second signal) to the pixels coupled to the second conductive line 208.

Subsequently, the primary circuit 202 may output a second driven signal to the output lines 218 and 216. At about the same time the flash circuit 204 may output a second flash signal to the flash output lines 214 and 212. The second driven signal may be the same or different from the driven signal above. In addition, the second flash signal may be the same as or different from the first flash signal. The line switch 206 couples the second output line 216 to the second conductive line 208 and couples the first flash output line 214 to the first conductive line 210. In this configuration, the column driver 200 is supplying the second driven signal (i.e., the first signal) to the pixels coupled to the second conductive line 208 and the second flash signal (i.e., the second signal) to the pixels coupled to the first conductive line 210.

With combined reference to FIGS. 2 and 1, the column driver 200 may be the first column driver 112A. The first conductive line 210/130A is coupled to the first pixel 126A, and the seventh pixel 126G in the odd-numbered rows (i.e., the first row and the third row) and the second conductive line 208/130B is coupled to the fourth pixel 126D in the even-numbered row (i.e., the second row). Thus, an image may be written using the driven signal to the first and seventh pixels 126A and 126G in the odd-numbered rows while the fourth pixel 126D in the even-numbered row is flashed using the flash signal. Subsequently, a second image may be written using the second driven signal to the fourth pixel 126D in the even-numbered row while the first and seventh pixels 126A and 126G in the odd-numbered rows are flashed using the second flash signal. This parallel activity is sometimes referred to as pipelined signals.

Referring back to FIG. 2, in some embodiments, the line switch 206 includes an intermediate position in which both the output lines 218 and 216 and the flash output lines 214 and 212 are decoupled from the first and second conductive lines 208 and 210. The intermediate position may occur between the output of the driven signal and the second driven signal, for instance. The intermediate position may avoid two signals, i.e., the first signal and the second signal, from being supplied on one of the conductive lines 210 and 208 simultaneously.

Figure 3:
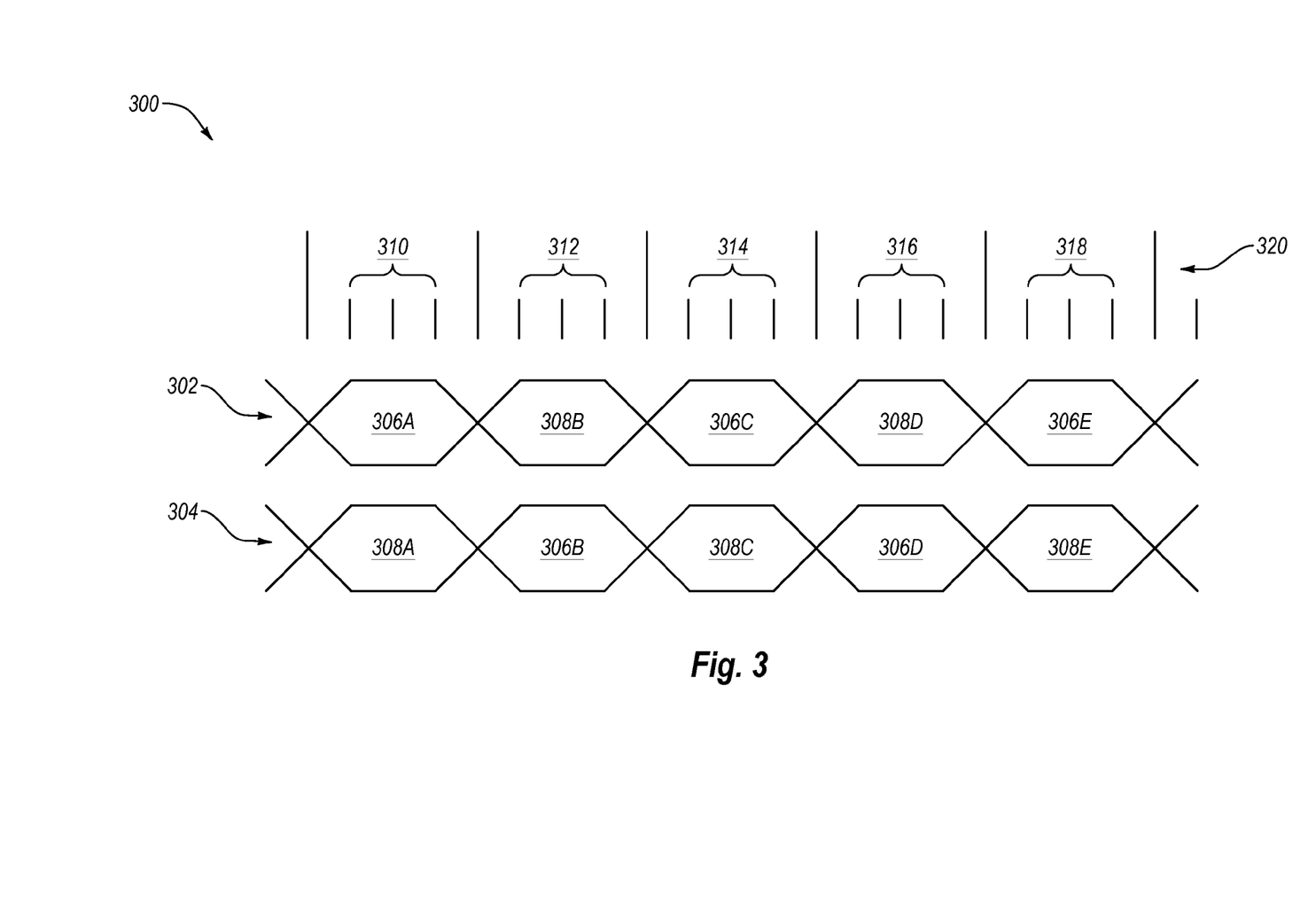
FIG. 3 is an example waveform illustrating an example operation of the column driver of FIG. 2.

The pipelined signals supplied in accordance with the parallel activity described above may continue during operation of a column driver. For example, FIG. 3 is an example waveform 300 illustrating an example operation of the column driver 200 of FIG. 2. The waveform 300 includes a set of hash marks 320, which generally represent time. The waveform 300 includes an even-numbered row waveform (even waveform) 302 and an odd-numbered row waveform (odd waveform) 304. For example, with combined reference to FIGS. 1 and 3, the even waveform 302 may include the signals supplied on the second conductive line 130B coupled to the fourth pixel 126D in the even-numbered row. Additionally, the odd waveform 304 may include the signals supplied on the first conductive line 130A coupled to the first and seventh pixels 126A and 126G in the odd-numbered rows.

Referring back to FIG. 3, each of the odd waveform 304 and the even waveform 302 may include driven signals 306A-306E and flash signals 308A-308E. Specifically, during a first time period 310, the even waveform 302 may include a driven signal 306A and the odd waveform 304 may include a flash signal 308A. During a second time period 312, the even waveform 302 may include a second flash signal 308B and the odd waveform 304 may include a second driven signal 306B. Similar, an alternating signal pattern may occur during time periods 314, 316, and 318.

In some embodiments, the flash signals 308A-308E may include about the same voltage during each of the time periods 310, 312, 314, 316, and 318. However, the driven signals 306A-306E may vary from one time period 310, 312, 314, 316, and 318 to the next. By supplying the flash signals 308A-308E between the driven signals 306A-306E, damage caused by absolute voltage differentials between rows of pixels may be substantially prevented. For example, with combined reference to FIGS. 1 and 3, the voltage differential between the rows that causes damage may be about 7 V. Additionally, in this example, the driven signals 306A-306E may include voltages that vary about 12 V. Accordingly, the flash signals 308A-308E may include a voltage of about 6 V and thus prevent the absolute voltage differential between the rows to reach the 7 V.

Figure 4:
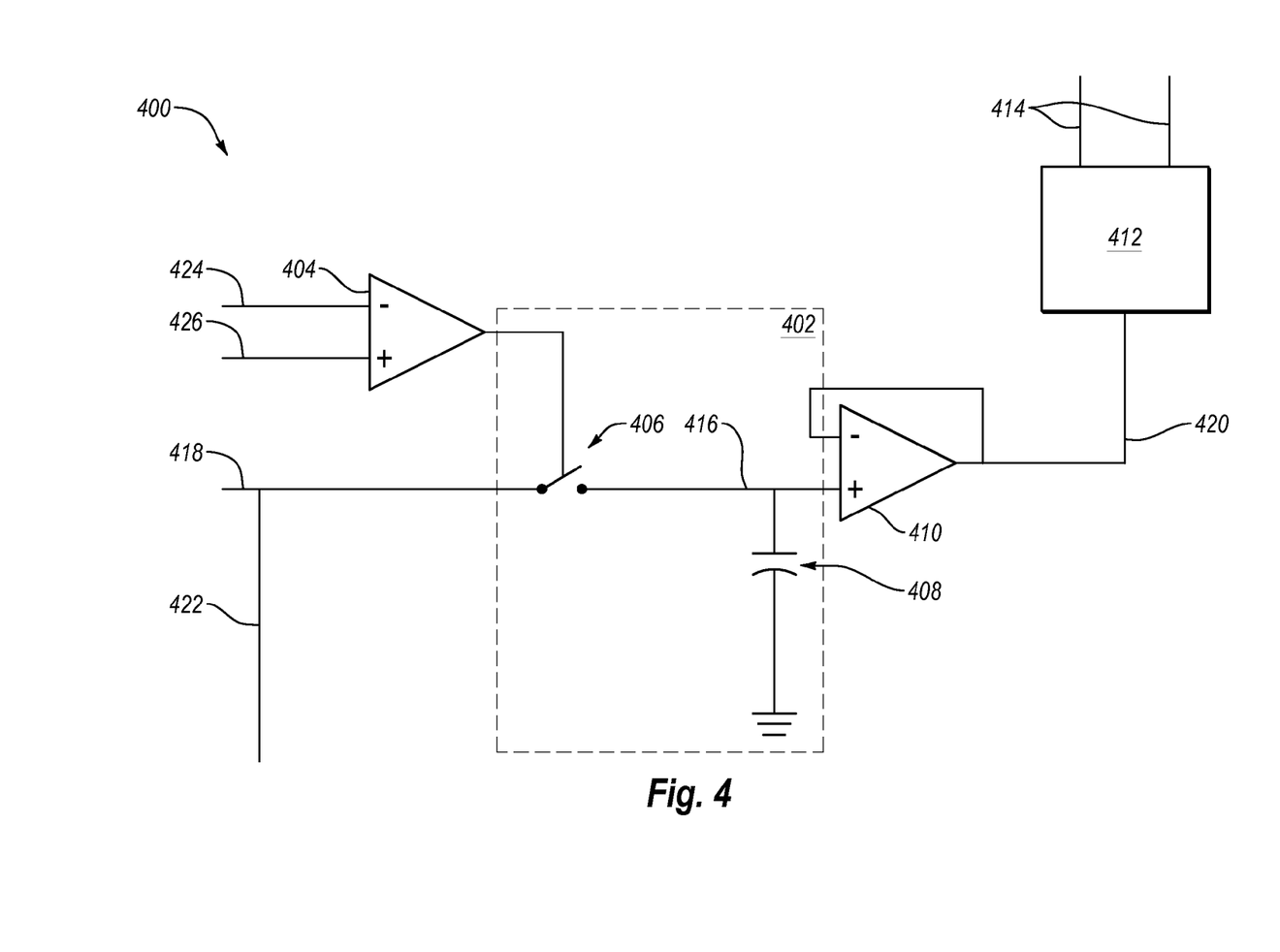
FIG. 4 is a block diagram of an example primary circuit which may be implemented in the column driver of FIG. 2.

FIG. 4 is a block diagram of an example primary circuit 400 that may be implemented in the column driver 200 of FIG. 2. The general purpose of the primary circuit 400 may include providing a driven signal to one or more conductive lines 414. The primary circuit 400 may include a sample and hold circuit 402. The sample and hold circuit 402 samples a voltage of an input signal supplied on an input line 418. For example, in some embodiments, the input signal may include the analog ramp signal described above.

The input line 418 is coupled to a sample switch 406 that regulates the input signal to a local input line 416 of a primary amplifier 410. While the sample switch 406 is closed, the input signal is supplied to the input line 418 of the primary amplifier 410 and to the primary capacitor 408. The primary amplifier 410 generates an output signal on an output line 420 and the primary capacitor 408 charges. When the sample switch 406 opens, the primary amplifier 410 continues to generate the output signal on the output line 420 to match the charge on the primary capacitor 408 and the local input line 416 is supplied by the primary capacitor 408. The output line 420 may couple the primary amplifier 410 to a line switch 412 that is coupled to the one or more conductive lines 414 and may generally operate similarly to the line switch 206 described above with respect to FIG. 2.

In this and other embodiments in which the input signal includes the analog ramp signal, while the analog ramp signal varies from the initial voltage to the target voltage, the sample switch 406 is closed. Thus, the analog ramp signal is supplied to the primary amplifier 410. The primary amplifier 410 generates an output signal on the output line 420 while the primary capacitor 408 charges. When the analog ramp signal reaches the target voltage, the sample switch 406 opens removing the analog ramp signal from the primary amplifier 410. The primary amplifier 410 may include a near-infinite input impedance, thus the primary amplifier 410 may continue to generate the output signal on the output line 420 equal to the charge on the primary capacitor 408 without the primary capacitor 408 discharging.

In some embodiments, the sample switch 406 is controlled by a digital comparator 404. The digital comparator 404 may receive a target count signal at a positive input line 426 and a ramp step signal at a negative input line 424, for instance. In this and other embodiments, the target count signal may indicate the number of time intervals required for the analog ramp signal to reach the target voltage. The target count signal may be communicated from a demultiplexing module that receives digital data from a driver circuit, such as a FPGA that controls a LCOS IC. For example, with combined reference to FIGS. 1 and 4, the FPGA 102 may communicate the digital data to the demultiplexing module 116. The digital data may include the target count signal that may be communicated to the column drivers 112 and more specifically to the positive input line 426.

With continued reference to FIGS. 1 and 4, the ramp step signal may indicate the number of time intervals during which the analog ramp signal has to be applied to the input line 418. The ramp step signal may be communicated to the negative input line 424 from the ramp counter 114. That is, the ramp counter 114 may receive the ramp counter enable signal from the FPGA 102 that starts the ramp counter 114 counting. The ramp counter enable signal may also represent a first time interval in which the analog ramp signal is applied to the input line 418. The ramp step signal then tracks the number of time intervals over which the analog ramp signal supplies the local input line 416.

In some embodiments, the digital comparator 404 holds the sample switch 406 closed while the ramp step signal is less than the target count signal. When the ramp step signal is equal to or greater than the target count signal, the sample switch 406 opens.

Additionally in some embodiments, the input line 418 may include a cross-circuit supply 422. The cross-circuit supply 422 may couple the input line 418 to an input line of a flash amplifier such as flash input line 518 of FIG. 5. Alternatively, the cross-circuit supply 422 may supply another circuit in another system.

Figure 5:
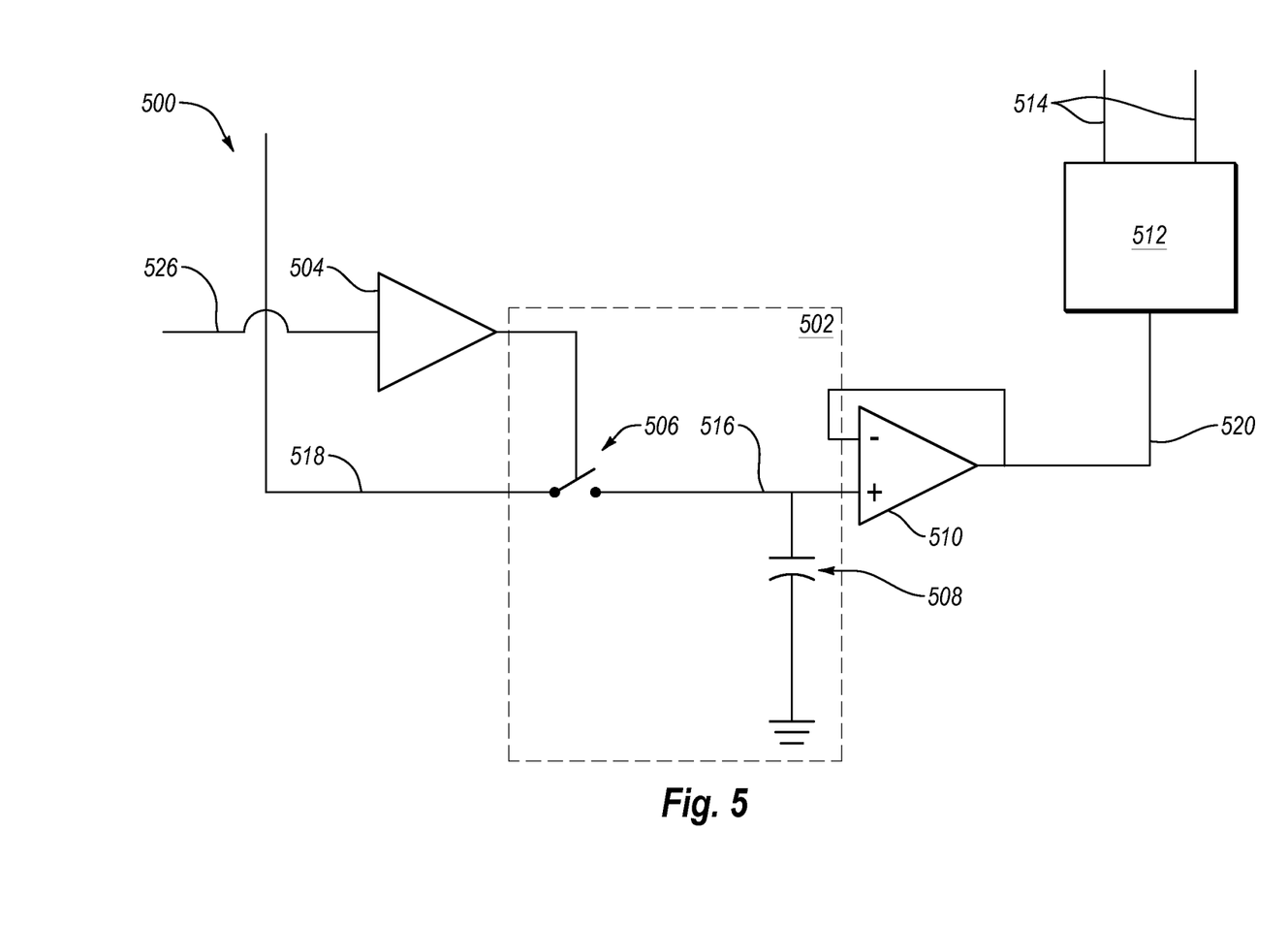
FIG. 5 is a block diagram of an example flash circuit which may be implemented in the column driver of FIG. 2.

FIG. 5 is a block diagram of an example flash circuit 500 that may be implemented in the column driver 200 of FIG. 2. The general purpose of the flash circuit 500 may include providing a flash signal to one or more conductive lines 514. The flash circuit 500 may include a second sample and hold circuit 502. The second sample and hold circuit 502 samples a flash input signal supplied on a flash input line 518. For example, in some embodiments, the flash input signal may include the analog ramp signal described above. For example, with combined reference to FIGS. 4 and 5, the cross-circuit supply 422 may be coupled to the flash input line 518. When a control signal is received by the buffer amplifier 504, the second sample and hold circuit 502 may sample the analog ramp signal.

The second sample and hold circuit 502 functions similarly to the sample and hold circuit 402 described with reference to FIG. 4. Specifically, the second sample and hold circuit 502 may include a flash amplifier 510 and a flash sample switch 506. The flash sample switch 506 may be configured to regulate the supply of the flash input signal to a local flash input line 516. The local flash input line 516 supplies the flash amplifier 510 and the flash sample capacitor 508. For example, when the flash sample switch 506 is closed, the flash input signal is supplied to the flash amplifier 510 and charges the flash sample capacitor 508. When the flash sample switch 506 is open, the flash input signal is isolated from the flash amplifier 510.

While the flash sample switch 506 is closed, the flash amplifier 510 generates a flash output signal that is about equal to the flash input signal. In addition, when the flash sample switch 506 is closed, the flash sample capacitor 508 is charged to a flash voltage. When the flash sample switch opens 506, the flash amplifier 510 may include a near-infinite input impedance, thus the flash amplifier 510 may continue to generate the flash output signal on a flash output line 520 about equal to the flash voltage on the flash sample capacitor 508 without the flash sample capacitor 508 discharging.

A flash output line 520 may couple the flash amplifier 510 to a line switch 512 and to one or more conductive lines 514. With combined reference to FIGS. 2, 4, and 5, in some embodiments, the line switches 512, 412, and 206 may be one component and may operate as described above.

In some embodiments, the flash sample switch 506 may be controlled by a buffer amplifier 504. The buffer amplifier 504 may receive the control signal on a buffer input line 526. The control signal may control the state of the flash sample switch 506. That is, in some embodiments, the buffer amplifier 504 may receive the control signal, from which the buffer amplifier 504 closes the flash sample switch 506 enabling the flash input signal to be supplied to the flash amplifier 510 and the flash sample capacitor 508.

With combined reference to FIGS. 1, 4, and 5, the control signal may be communicated by the FPGA 102 to the buffer input line 526. As stated above, the analog ramp signal may monotonically vary from a high voltage to a low voltage as well as from a low voltage to a high voltage. Additionally or alternatively, the analog ramp signal may transition from a lower, non-inverted voltage domain to an upper, inverted voltage domain. In these and other embodiments, the control signal may only be communicated when the analog ramp signal is making the transition.

Figure 6:
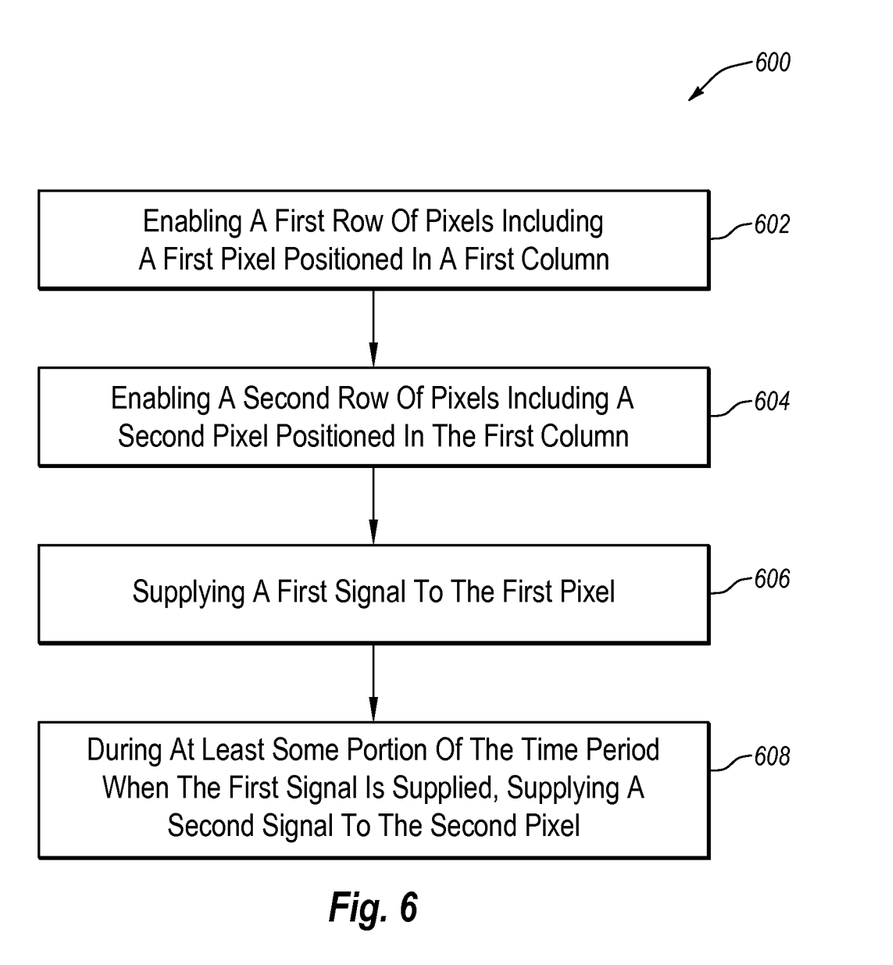
FIG. 6 is a flowchart of an example method of pipelined pixel writing in a LCOS system such as the LCOS system of FIG. 1.

FIG. 6 is a flowchart of an example method 600 of signal communication in a liquid crystal on silicon integrated circuit. The method 600 can be implemented on the LCOS system 100 of FIG. 1 in some embodiments. One skilled in the art will appreciate that, for this and other processes and methods disclosed herein, the functions performed in the processes and methods may be implemented in differing order or in parallel. Furthermore, the outlined steps and operations are only provided as examples, and some of the steps and operations may be optional, combined into fewer steps and operations, or expanded into additional steps and operations without detracting from the disclosed embodiments.

The method 600 may begin at 602 by enabling a first row of pixels including a first pixel positioned in a first column. The first pixel may be electrically coupled to a row enable amplifier, for example, that may communicate an activation signal to the first pixel. By enabling the first pixel, the first pixel may become receptive to voltages.

At 604, the method 600 may include enabling a second row of pixels including a second pixel positioned in the first column. The second pixel may be electrically coupled to a second row enable amplifier, for example, that may communicate a second activation signal to the second pixel. In some embodiments, enabling the first row of pixels of 602 and enabling the second row of pixels of 604 may be performed simultaneously. The activation signal and/or the second activation signal may be generated or otherwise communicated by a row decode that may be controlled by a command decoder. The command decoder may receive commands from a command port of an FPGA or another driver circuit.

At 606, the method 600 may include supplying a first signal to the first pixel. Additionally, in some embodiments, the method 600 may include receiving an analog ramp signal that monotonically varies from an initial voltage to a final voltage. The first target voltage and the second target voltage may be between the initial voltage and the final voltage. The first target voltage may be produced by sampling the analog ramp signal from the initial voltage until the first target voltage and the second target voltage may be produced by sampling the analog ramp signal from the initial voltage until the second target voltage.

During at least some portion of the time period when the first signal is supplied, at 608, the method 600 may include supplying a second signal to the second pixel. Additionally, the method 600 may also include switching the state of a line switch, which is electrically coupled to a first conductive line and a second conductive line. Switching the state of the line switch may alter whether the first conductive line is electrically coupled to a first circuit included in a column driver or a second circuit included in the column driver and may alter whether the second conductive line is electrically coupled to the first circuit or the second circuit.

Additionally, following the supply of the first signal and the second signal, a third row of pixels may be enabled including a third pixel in the first column. A third signal may be supplied to the second pixel. During at least some portion of the time period when the third signal is supplied to the second pixel, a fourth signal may be supplied to the third pixel.

In some embodiments, the first signal may be a first target voltage, which is written to the first pixel. Additionally, the second signal may be a first flash signal, which is flashed to the second pixel. In these and other embodiments, following the supply of the first target voltage and the first flash signal, in the method 600 a third row of pixels may be enabled which included a third pixel in the first column. A second target voltage may be written to the second pixel. During at least some portion of the time period when the second pixel is written, a second flash voltage may be flashed to the third pixel.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A liquid crystal on silicon integrated circuit comprising:
    a plurality of pixels that are arranged in a pixel array;
    a column driver that includes:
        a line switch; and
        a primary circuit configured to supply a driven signal and a flash circuit configured to supply a flash signal to a single column of pixels of a plurality of columns of pixels included in the pixel array, the primary circuit including a sample and hold circuit including a primary amplifier coupled to the line switch and a sample switch configured to regulate input of an analog ramp signal to the primary amplifier, wherein the analog ramp signal varies from an initial voltage to a target voltage; and
    a plurality of conductive lines, wherein:
        a first conductive line of the plurality of conductive lines couples the column driver to a first subset of pixels in the single column of pixels,
        a second conductive line of the plurality of conductive lines couples the column driver to a second subset of pixels in the single column of pixels, and
        the plurality of conductive lines are configured such that a first signal of the driven signal and the flash signal can be supplied to the first subset of pixels and a second signal of the driven signal and the flash signal can be supplied to the second subset of pixels with some overlapping duration,
    wherein the line switch is configured to couple the primary circuit to one of the first conductive line or the second conductive line and to couple the flash circuit to the other of the first conductive line or the second conductive line.

2. The liquid crystal on silicon integrated circuit of claim 1, wherein:
    the first subset of pixels comprises the pixels positioned in even-numbered rows of the single column of pixels; and
    the second subset of pixels comprises the pixels positioned in odd-numbered rows of the single column of pixels.

3. The liquid crystal on silicon integrated circuit of claim 1, wherein the primary circuit comprises a digital comparator configured to control the sample switch, the digital comparator configured to receive a target count signal and a ramp step signal which indicates a number of predetermined time intervals during which the analog ramp signal has been input to the primary amplifier.

4. The liquid crystal on silicon integrated circuit of claim 1, wherein the flash circuit comprises:
    a sample and hold circuit including:
        a flash amplifier coupled to the line switch; and
        a flash sample switch configured to regulate input of a flash input signal to the flash amplifier.

5. The liquid crystal on silicon integrated circuit of claim 4, wherein the flash input signal comprises an analog ramp signal.

6. The liquid crystal on silicon integrated circuit of claim 5, wherein the flash circuit further comprises a buffer amplifier configured to receive a control signal and control the flash sample switch.

7. A method of pipelined pixel signal communication in a liquid crystal on silicon integrated circuit, the method comprising:
    enabling a first row of pixels that includes a first pixel that is positioned in a first column and coupled via a first conductive line to a single column driver;
    enabling a second row of pixels that includes a second pixel that is positioned in the first column and coupled via a second conductive line to the single column driver;
    supplying, by the single column driver and via the first conductive line, a first signal to the first pixel;
    during at least some portion of a time period when the first signal is supplied, supplying, by the single column driver and via the second conductive line, a second signal to the second pixel, wherein:
        the first signal includes a first target voltage and the second signal includes a first flash voltage, or
        the first signal includes a first flash voltage and the second signal includes a a first target voltage;
    following the supply of the first target voltage and the first flash voltage, enabling a third row of pixels including a third pixel in the first column;
    writing a second target voltage to the second pixel;
    during at least some portion of the time period when the second pixel is written, flashing the third pixel to a second flash voltage;
    receiving an analog ramp signal that monotonically varies from an initial voltage to a final voltage, wherein the first target voltage and the second target voltage are between the initial voltage and the final voltage;
    producing the first target voltage by sampling the analog ramp signal for at least a portion of a time when the analog ramp signal is between the initial voltage and the first target voltage; and
    producing the second target voltage by sampling the analog ramp signal for at least a portion of a time when the analog ramp signal is between the initial voltage and the second target voltage.

8. The method of pipelined pixel signal communication of claim 7, further comprising:
    switching state of a line switch electrically coupled to the first conductive line and the second conductive line.

9. The method of pipelined pixel signal communication of claim 8, wherein switching the state of the line switch alters whether the first conductive line is electrically coupled to a first circuit included in the single column driver or a second circuit included in the single column driver and alters whether the second conductive line is electrically coupled to the first circuit or the second circuit.

10. The method of pipelined pixel signal communication of claim 7, further comprising:
    following the supply of the first signal and the second signal, enabling a third row of pixels including a third pixel in the first column;
    supplying a third signal to the second pixel; and
    during at least some portion of a time period when the third signal is supplied to the second pixel, supplying a fourth signal to the third pixel.

11. A liquid crystal on silicon integrated circuit comprising:
    a plurality of pixels that are arranged in a pixel array;
    a column driver that includes:

a line switch; and a primary circuit configured to supply a driven signal and a flash circuit configured to supply a flash signal to a single column of pixels of a plurality of columns of pixels included in the pixel array, the flash circuit including a sample and hold circuit including a flash amplifier coupled to the line switch and a flash sample switch configured to regulate input of a flash input signal to the flash amplifier; and a plurality of conductive lines, wherein:

a first conductive line of the plurality of conductive lines couples the column driver to a first subset of pixels in the single column of pixels, a second conductive line of the plurality of conductive lines couples the column driver to a second subset of pixels in the single column of pixels, and the plurality of conductive lines are configured such that a first signal of the driven signal and the flash signal can be supplied to the first subset of pixels and a second signal of the driven signal and the flash signal can be supplied to the second subset of pixels with some overlapping duration, wherein the line switch is configured to couple the primary circuit to one of the first conductive line or the second conductive line and to couple the flash circuit to the other of the first conductive line or the second conductive line.

12. The liquid crystal on silicon integrated circuit of claim 11, wherein:

the first subset of pixels comprises the pixels positioned in even-numbered rows of the single column of pixels; and the second subset of pixels comprises the pixels positioned in odd-numbered rows of the single column of pixels.

13. The liquid crystal on silicon integrated circuit of claim 11, wherein the primary circuit comprises:

a sample and hold circuit including:

a primary amplifier coupled to the line switch; and a sample switch configured to regulate input of an analog ramp signal to the primary amplifier, wherein the analog ramp signal varies from an initial voltage to a target voltage.

14. The liquid crystal on silicon integrated circuit of claim 13, wherein the primary circuit further comprises a digital comparator configured to control the sample switch, the digital comparator configured to receive a target count signal and a ramp step signal which indicates a number of predetermined time intervals during which the analog ramp signal has been input to the primary amplifier.

15. The liquid crystal on silicon integrated circuit of claim 11, wherein the flash input signal comprises an analog ramp signal.

16. The liquid crystal on silicon integrated circuit of claim 15, wherein the flash circuit further comprises a buffer amplifier configured to receive a control signal and control the flash sample switch.

* * * * *